(12) United States Patent
Taylor et al.

(10) Patent No.: US 8,480,052 B2
(45) Date of Patent: Jul. 9, 2013

(54) VIBRATION ISOLATING DEVICE

(75) Inventors: Russell B. Taylor, Melbourne, FL (US);
Jeremy Hutcherson, Cape Canaveral, FL (US); Vinson Loos, Melbourne, FL (US)

(73) Assignee: DRS Tactical Systems, Inc., Melbourne, FL (US)

( * ) Notice: Subject to any disclaimer, the term of this patent is extended or adjusted under 35 U.S.C. 154(b) by 63 days.

(21) Appl. No.: 13/004,107

(22) Filed: Jan. 11, 2011

(65) Prior Publication Data
US 2012/0175489 A1    Jul. 12, 2012

(51) Int. Cl.
*F16M 1/00* (2006.01)

(52) U.S. Cl.
USPC ........... 248/638; 248/563; 248/636; 248/610; 248/619; 720/651; 361/679.36; 361/679.35; 267/152; 267/153

(58) Field of Classification Search
USPC .......... 248/563, 638, 610, 618, 619; 720/651; 361/679.36, 679.34; 267/136, 152, 153, 292
See application file for complete search history.

(56) References Cited

U.S. PATENT DOCUMENTS

| | | | | |
|---|---|---|---|---|
| 3,145,012 A * | 8/1964 | Kfoury | | 248/568 |
| 3,323,764 A * | 6/1967 | Johnson | | 267/140.4 |
| 3,762,694 A * | 10/1973 | MacDonnell | | 267/3 |
| 4,251,045 A * | 2/1981 | Meyerle | | 248/619 |
| 4,482,125 A * | 11/1984 | Ziernicki | | 248/604 |
| 4,831,476 A * | 5/1989 | Branc et al. | | 360/99.15 |
| 5,042,024 A * | 8/1991 | Kurosawa et al. | | 720/651 |
| 5,100,096 A * | 3/1992 | Mizuno et al. | | 248/638 |
| 5,207,081 A * | 5/1993 | Fuse | | 68/23.1 |
| 5,379,990 A * | 1/1995 | Ando et al. | | 267/34 |
| 5,456,454 A * | 10/1995 | Schulz et al. | | 267/293 |
| 5,566,156 A * | 10/1996 | Choi | | 720/634 |
| 5,663,943 A * | 9/1997 | Yanagisawa et al. | | 720/651 |
| 5,667,202 A * | 9/1997 | Gwinn | | 267/33 |
| 5,953,303 A * | 9/1999 | Sugano et al. | | 720/651 |
| 6,129,445 A * | 10/2000 | Landy | | 362/369 |
| 6,252,768 B1 * | 6/2001 | Lin | | 361/679.34 |
| 6,371,434 B1 | 4/2002 | Becker et al. | | |
| 6,498,722 B1 | 12/2002 | Stolz | | |
| 6,579,002 B1 * | 6/2003 | Bartick et al. | | 366/112 |
| 6,614,747 B2 * | 9/2003 | Imai et al. | | 720/693 |
| 7,016,189 B2 * | 3/2006 | Lin | | 361/679.34 |
| 7,079,380 B2 * | 7/2006 | Wubs | | 361/679.35 |
| 7,182,506 B2 * | 2/2007 | Schulz et al. | | 366/217 |
| 7,188,993 B1 * | 3/2007 | Howe et al. | | 366/111 |
| 7,251,131 B2 | 7/2007 | Shah et al. | | |
| 7,267,313 B2 * | 9/2007 | Krzoska et al. | | 248/316.8 |
| 7,487,958 B2 * | 2/2009 | Wang | | 267/136 |
| 7,507,015 B2 * | 3/2009 | Wang | | 366/217 |
| 7,520,660 B2 * | 4/2009 | Schulz et al. | | 366/217 |

(Continued)

*Primary Examiner* — Terrell McKinnon
*Assistant Examiner* — Daniel J Breslin
(74) *Attorney, Agent, or Firm* — Kilpatrick Townsend & Stockton LLP (57) ABSTRACT

A vibration isolating device for isolating an object from at least one of vibration and shock from an external source. The vibration isolation device comprises such features as a mounting structure where the object is mounted to, at least a plurality of first springs coupled to the mounting structure to minimize coupling of the at least one vibration and shock to the object, and a shock stop. In addition, the device may include a plurality of stop pins that are separate from the mounting structure and arranged externally to the mounting structure. The stop pins can limit a displacement of the object when the at least one of vibration and shock exceeds a given level.

26 Claims, 7 Drawing Sheets

U.S. PATENT DOCUMENTS

| | | | |
|---|---|---|---|
| 7,837,380 B2* | 11/2010 | Wang | 366/217 |
| 7,856,916 B2* | 12/2010 | Anderson | 89/44.02 |
| 7,866,878 B2* | 1/2011 | Howe et al. | 366/108 |
| 2002/0053632 A1 | 5/2002 | Becker et al. | |
| 2003/0174464 A1* | 9/2003 | Funawatari et al. | 361/685 |
| 2003/0210519 A1 | 11/2003 | Wubs | |
| 2006/0023416 A1 | 2/2006 | Chen | |
| 2006/0254869 A1* | 11/2006 | Wang | 188/378 |
| 2006/0255517 A1 | 11/2006 | Lee | |
| 2008/0239654 A1 | 10/2008 | Bisson | |
| 2010/0051778 A1 | 3/2010 | Wu | |

* cited by examiner

VIBRATION ISOLATING DEVICE

FIELD OF THE INVENTION

This invention relates generally to vibration-reducing techniques, and more particularly, to a device for isolating an object from vibrations and/or shocks, and further, for protecting other object(s) in a vicinity of the object subjected to vibrations and/or shocks.

BACKGROUND

Mechanical hard drives, CD-ROMS, DVD-ROMS, etc. are some of examples of many objects that contain mechanically sensitive parts. When subjected to vibrations or shocks from external sources, such objects may suffer from a degraded performance or even a complete failure.

Often, vibration-sensitive objects are located within a larger system (e.g., a computer, a moving vehicle, a machinery, etc.), and thus become susceptible to vibrational disturbances and shocks external to the system or generated by other components within the system. More particularly, vibrations and/or shocks external to the system or generated by other components within a system itself could be transmitted to the object, potentially causing undesirable effects, such as performance degradation or a movement of the object.

In this regard, a sufficiently strong vibration or shock could displace the object to the point of "bumping" against other adjacent objects. Some shock or vibrations could be of such high magnitudes that damage to one or both of the objects may be inevitable.

Unfortunately, current vibration isolating systems may not be able to effectively isolate an object from external vibrations and/or shocks, and also minimize displacement of the object such as to protect system components from a potential damage.

SUMMARY

Advantageously, the present invention provides a vibration isolating device to isolate an object, such as a hard disk drive, from vibration and/or a shock that may come from an external source. Further, the vibration isolating device comprises features to protect the object and adjacent object(s) from damage that otherwise may result from a contact of the object with the adjacent object(s) in the presence of vibration and/or shock.

In one illustrative embodiment, the vibration isolating device comprises (i) a mounting structure having an area for mounting the object thereon, (ii) a plurality of first springs coupled to the mounting structure and operative to minimize coupling of the at least one vibration and shock to the object, (iii) a shock stop separate from the mounting structure comprising a first shock-absorbing material, and (iv) a plurality of stop pins separate from the mounting structure and arranged externally about the mounting structure, the plurality of stop pins operative to limit a displacement of the object when the at least one vibration and shock exceeds a given level. The vibration isolating device may further comprise a plurality of second springs that are operative to further minimize coupling of the at least one vibration and shock to the object.

These as well as other aspects and advantages will become apparent to those of ordinary skill in the art by reading the following detailed description, with reference where appropriate to the accompanying drawings.

BRIEF DESCRIPTION OF THE DRAWINGS

The device, in accordance with one or more embodiments, is described in detail with reference to the following drawings. The drawings are provided for purposes of illustration only and merely depict typical or example embodiments. These drawings are provided to facilitate the reader's understanding and shall not be considered limiting of the breadth, scope, or applicability of the disclosure. It should be noted that for clarity and ease of illustration these drawings are not necessarily made to scale.

Some of the figures included herein illustrate various embodiments from different viewing angles. Although the accompanying descriptive text may refer to such views as "top," "bottom" or "side" views, such references are merely descriptive and do not imply or require that the embodiment be implemented or used in a particular spatial orientation unless explicitly stated otherwise.

The figures are not intended to be exhaustive or limited to the precise form disclosed. It should be understood that the invention can be practiced with modification and alteration, and that it is limited only by the claims and the equivalents thereof.

DETAILED DESCRIPTION

Figure 1:
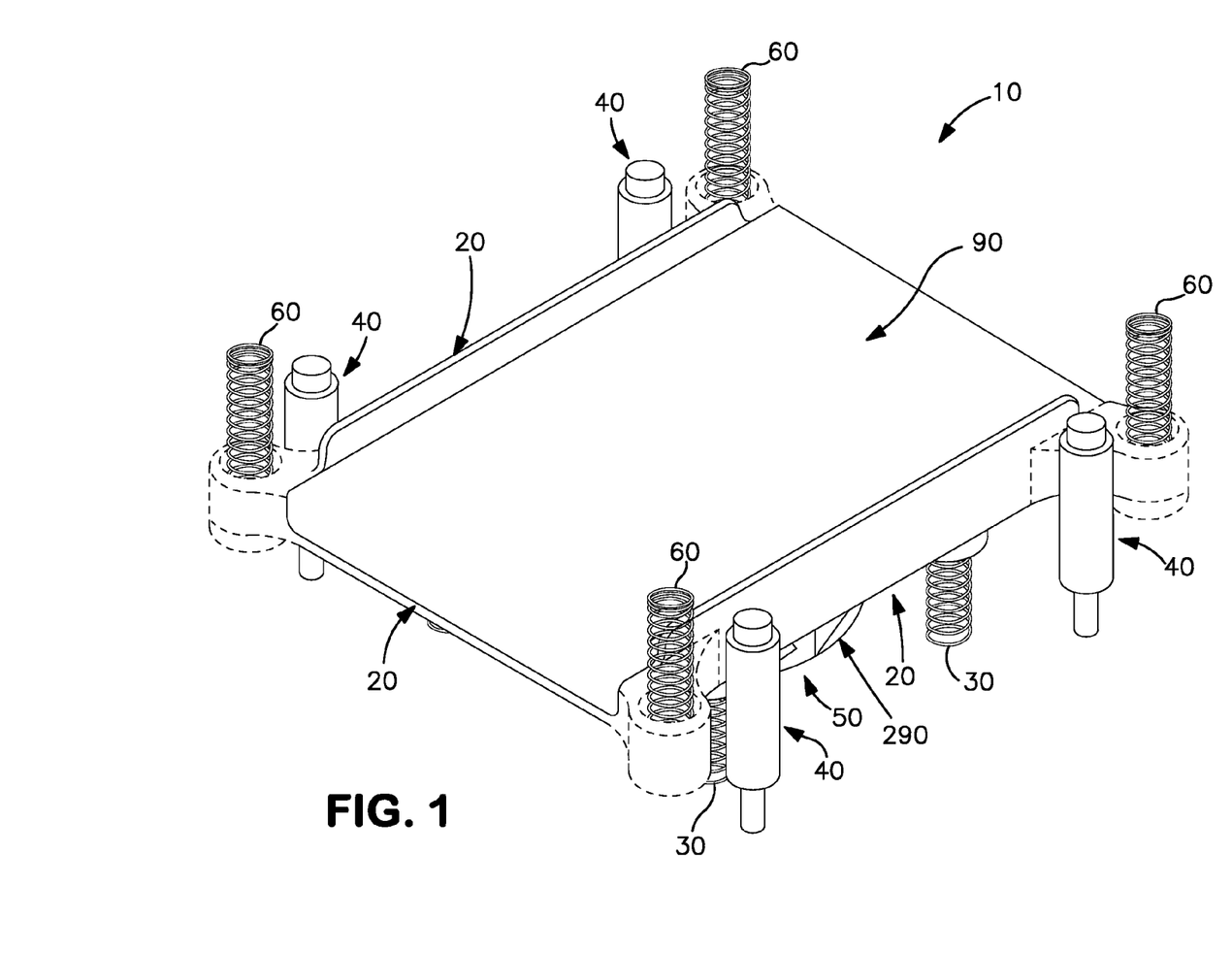
FIG. 1 is a perspective view of the vibration isolating device in accordance with an embodiment of the present invention.

FIG. 1 illustrates a perspective view of a vibration isolating device 10 according to one illustrative embodiment. As shown in FIG. 1, vibration isolating device 10 generally includes a mounting structure 20, a plurality of first springs, such as bottom springs 30, coupled to mounting structure 20, and stop pins 40 and shock stop 50 that are separate from the mounting structure and arranged externally to the mounting structure.

Figure 2:
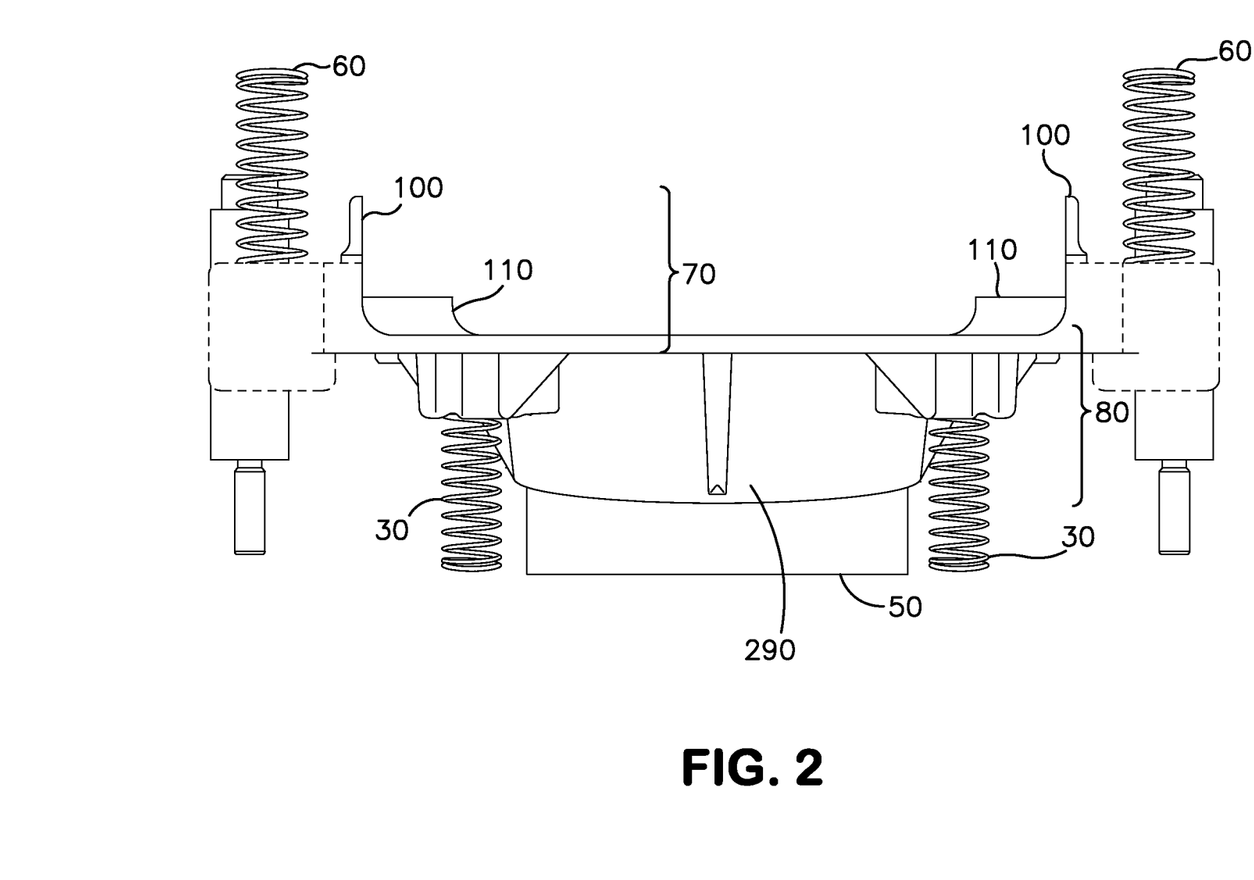
FIG. 2 is an end view of the vibration isolating device in accordance with an embodiment of the present invention.

Bottom springs 30 and shock stop 50 are shown in more detail in FIG. 2 depicting a side view of the vibration isolating device of FIG. 1. As shown in FIGS. 1 and 2, in some embodiments, vibration isolating device 10 may further include a plurality of second springs, such as top springs 60, coupled to the mounting structure and disposed in a direction opposite from the plurality of first springs, such as bottom springs 30.

As shown in FIG. 2, mounting structure 20 may include a top portion 70 and a bottom portion 80. An object to be isolated from a vibration and/or shock may be mounted onto an area within the top portion 70 of the mounting structure. More specifically, as shown in FIG. 1, top portion 70 may include a flat rectangular base 90 onto which the object could be mounted. In this regard, the size/surface area of base 90 may be adjusted accordingly to accommodate a particular object. As shown, each of the top springs 60 and bottom springs 30 is arranged substantially perpendicular to base 90 of the mounting structure.

Further, top portion 70 may include side walls 100 to secure the object, and in some embodiments, may also include side portions 110 (shown in FIG. 2), that in combination with side walls 100, may further secure the object within the mounting structure. In addition, the object could be attached to top portion 70 by other means, such as screws for example. It should be understood that mounting structure 20 is not confined to a rectangular form and could take other forms as well.

Figure 3:
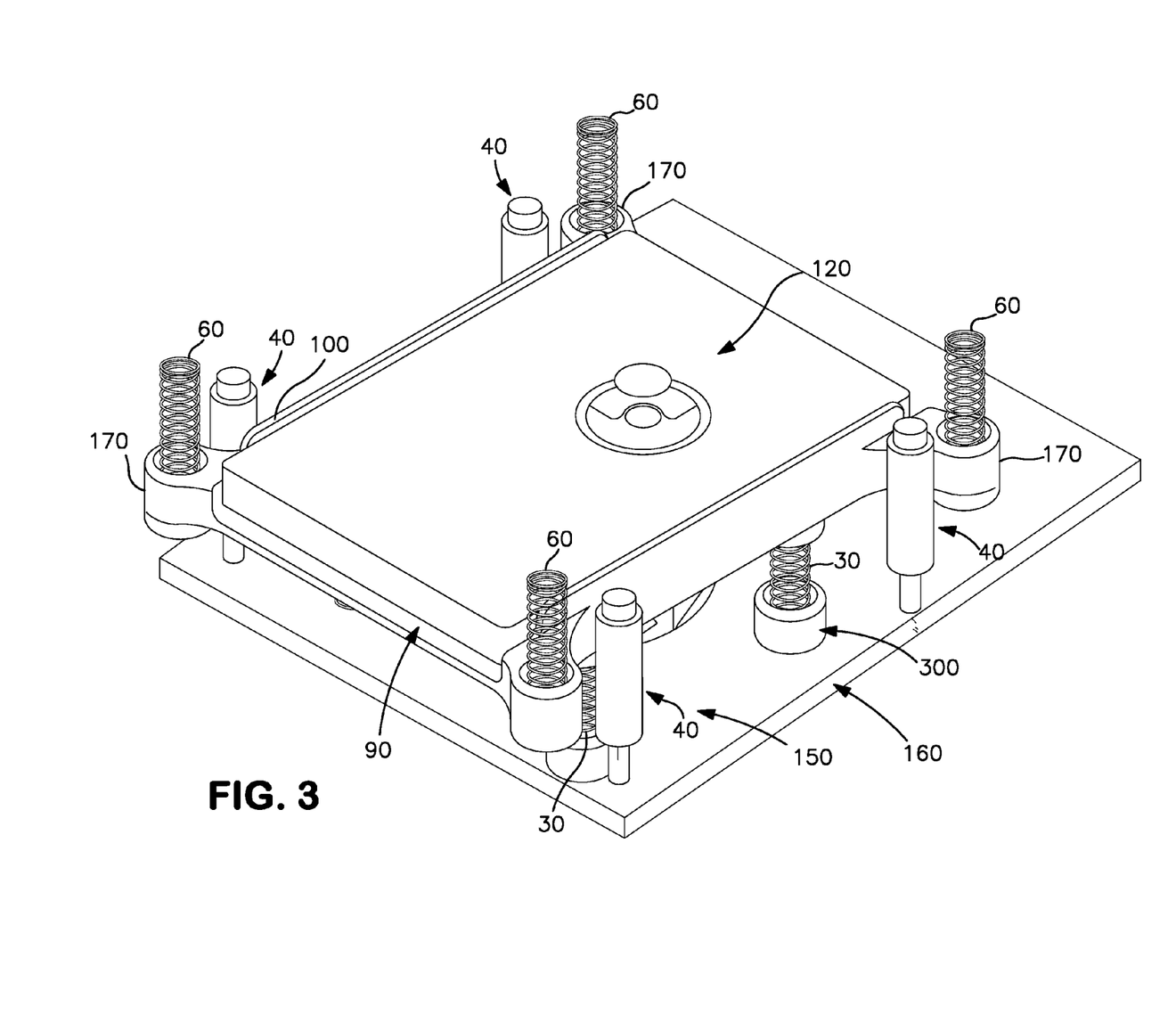
FIG. 3 is a perspective view of the vibration isolating device in accordance with an embodiment of the present invention with an object installed thereon.
Figure 4:
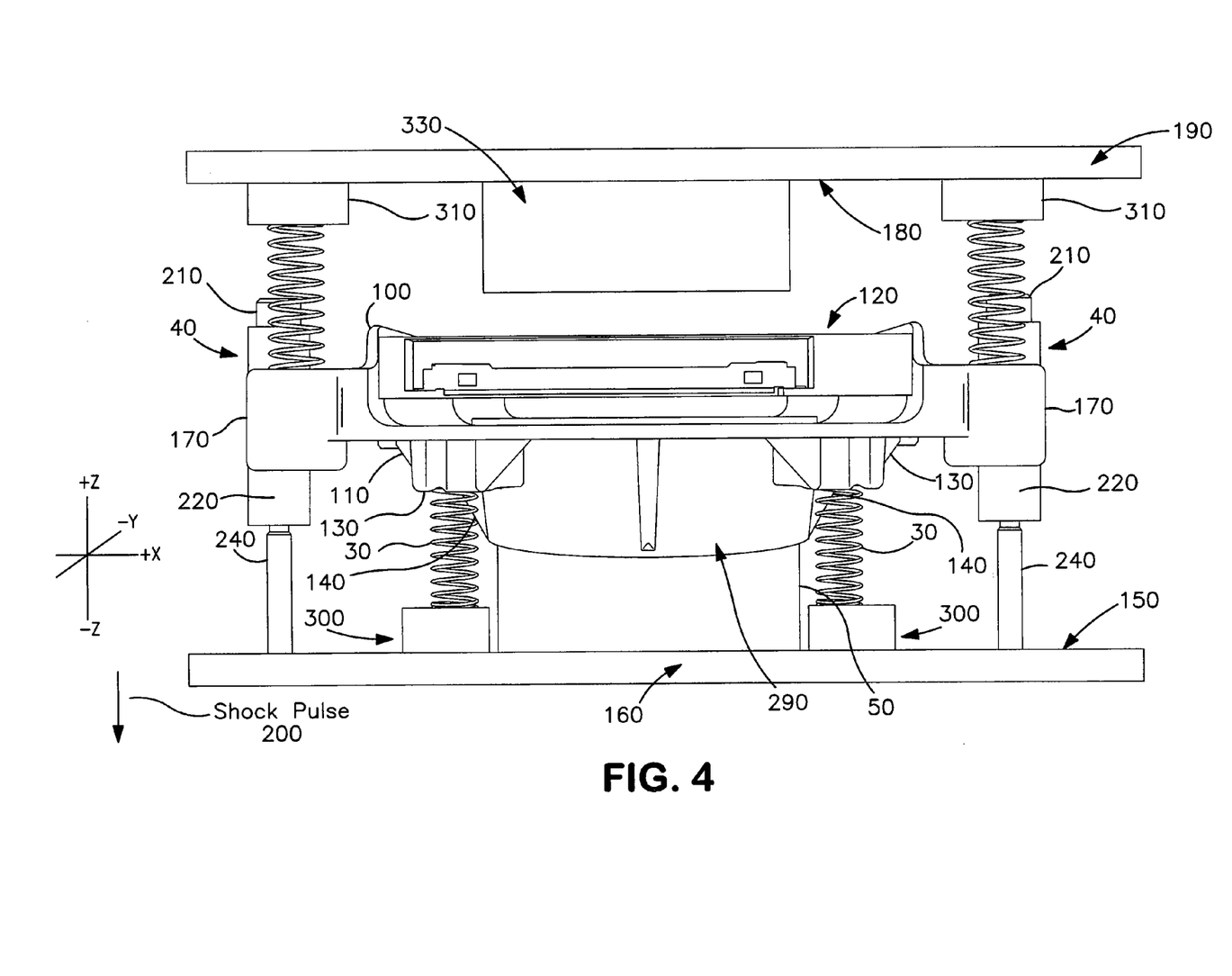
FIG. 4 is an end view of the vibration isolating device, including object 120 in accordance with an embodiment of the present invention.

FIGS. 3 and 4 illustrate respectively the embodiments of FIGS. 1 and 2, including an object 120. For example, object 120 could be a mechanical hard disk drive (e.g., an HDD), such as shown in FIG. 4. However, in other embodiments, vibration isolating device 10 may be used to provide vibration and shock isolation for a variety of other objects, examples of which include a DVD-ROM, a CD-ROM, an optics assembly, a laser assembly, a solid state drive, and an LCD assembly.

As shown in FIG. 3, object 120 may be mounted or attached to base 90, where the size of base 90 and side walls 100 may be adjusted to the size of object 120, such as to securely hold the object in place. FIG. 4 shows an end view of object 120, with side portions 110 that further secure the object within mounting structure 20. Such arrangement may assist in holding the object in place more securely, in the event object 120 becomes loosened when subjected to high vibrations and/or shocks.

In general, vibration isolating device 10 may be provided to protect object 120 when the object is subjected to a vibration and/or shock from an external source. Object 120 could be a standalone object or a component of a larger system. Typically, object 120, such as a hard disk drive for example, would be placed in a larger system (e.g., a computer). As such, any vibrations and/or shocks applied externally to or experienced by the system, or alternatively, generated by other components within a system itself (e.g., a 60 Hz or 120 Hz noise signals from a power supply, etc.) could be transmitted, or coupled, to object 120.

Such vibration or other external forces may cause undesirable effects, such as a mechanical disturbances within object 120 or a movement of the object. Particularly, when subjected to vibration and/or shock, object 120 could be displaced such as to come into contact with other adjacent, or neighboring, objects. Depending on the amplitude (or magnitude) of a vibration or shock, the displacement of the object could be substantial, leading to an impact with another object and possible damage to either one of the objects.

In one illustrative embodiment, vibration isolating device 10 provides a number of features to provide isolation from external vibrations and/or shocks to the object 120. In addition, some features of the vibration isolating device 10 may also provide damage protection to adjacent objects and/or object 120 that could otherwise result from contact between objects in the presence of vibration or shock.

In one aspect, vibration isolating device 10 comprises bottom springs 30, coupled to mounting structure 20. As shown, for example, in FIGS. 3 and 4, bottom springs 30 may be coupled to bottom portion 80 of the mounting structure, and may be operative to minimize coupling, or transmission, of a vibration and/or shock to object 120. In one embodiment, vibration isolating device 10 comprises four bottom springs. Each of the bottom springs 30 may include a coil compression spring, such as any suitable helical compressions spring (e.g., a COTS helical compression spring). Further, each of the bottom springs 30 may be coupled to mounting structure 10 via a spring holder 130. Preferably, bottom springs 30 will be arranged such as to substantially equally load each of the bottom spring. As shown in FIGS. 3 and 4, each of spring holders 130 is preferably an integral part of mounting structure (e.g., formed in the same mold as the mounting structure). However, each of spring holders 130 may also be a separate part coupled to the mounting structure 20 by means such as welding, bolting, etc.

It should be noted that one benefit of coupling bottom springs 30 via holders 130 is that the holders may help to stabilize each spring and limit deflection and sideways motion of the spring during vibration and/or shock. In this regard, the depth of each spring holder may be adjusted based on a given application and/or anticipated magnitude of vibrational/shock disturbance. Note that bottom portion 80 of mounting structure 20 may be shaped accordingly to accommodate spring holders 130 and provide clearance for the bottom springs. As shown in the example of FIG. 4, bottom portion 80 of the mounting structure 20 could have, for example, a basin-like shape with slanted sides 140.

Note, however, that it may be possible to couple bottom springs 30 to mounting structure 20 in other ways, such as through the use of suitable spring mounts, snubbers, and the like.

Bottom springs 30 may be disposed on any suitable support or bearing surface. Preferably, bottom springs 30 will be mounted such that mounting structure 20 is substantially leveled. In one embodiment, as shown in FIGS. 3 and 4, bottom springs 30 are mounted within bottom mounting cups 300 which are disposed onto a surface 150 adjacent to object 120, such as an adjacent object 160 sitting below object 120. Generally, the ends of helical compression springs 30 are not attached to bottom cups 300 and springs 30 just "sit" within the bottom mounting cups 300 on surface 150. Alternatively, the spring could be attached to the surface via any suitable means to hold the spring in place.

In an illustrative embodiment, bottom springs 30 may operate to "absorb" external vibrational and shock excitations to minimize transmission of such excitations to object 120, and thus to isolate object 120 from such excitations. Further, bottom springs 30 may prevent object 120 from contacting other objects, such as adjacent object 160.

In general, vibration isolation is a function of transmissibility, and is expressed as a percent ($I=(1-T)*100$)), where transmissibility denotes a ratio of a force transmitted to an object and an input force. Minimizing the amount of vibrations and/or shocks transmitted to object 120 will maximize the isolation. To achieve a desired amount of isolation, various spring parameters may be calculated/selected accordingly.

In particular, parameters, such as a spring stiffness (or spring rate), spring diameter, wire diameter, wire material, wire end conditions and spring-free length, etc., may be computed and/or adjusted accordingly to meet specific isolation design criteria and also to maximize spring life for various load conditions, anticipated vibration/shock conditions, etc. The parameters for spring selection can be based on well known formulas familiar to those skilled in the art. To avoid system failure resulting from improper selection of springs, spring factors for each of the springs in the system should be solved simultaneously. Those skilled in the art will appreciate that various available spring simulation or calculation tools could be used for this purpose.

Although bottom springs 30 may be able to provide a certain degree of isolation, the present invention provides additional features to further isolate object 120 from vibrations and/or shocks. In particular, as noted above, vibration isolating device 10 may further comprise second springs 60, as shown in FIGS. 3 and 4 for example, that are disposed in a direction opposite from bottom springs 30.

In particular, as shown in FIGS. 3 and 4, second springs 60 may be coupled to top portion 70 of mounting structure 20, such as at respective four corners of base 90. Top springs 60 may be operative to further minimize coupling, or transmission, of external vibration and/or shock to object 120, and generally, to further stabilize the object. In one embodiment, vibration isolating device 10 may comprise four top springs 60.

Like bottom springs 30, each of top springs 60 may include a coil compression spring, such as any suitable helical compressions spring (e.g., a COTS helical compression spring). Further, each of the top springs may be coupled to mounting structure 20 via a spring holder 170. Similarly, as shown in FIG. 4 each top spring 60 will held in place on the top end by upper spring cup 310. In one example, spring cup 310 is mounted to surface 180 of another object adjacent to object 120, such as an adjacent object 190 sitting above object 120, as shown.

As also shown in FIGS. 3 and 4, each of spring holders 170 will preferably be an integral part of mounting structure 20 (e.g., formed in the same mold as the mounting structure). However, each of spring holders 170 could also be a separate part coupled to the mounting structure by any known means, such as welding or bolting. Likewise, spring cups 300 and 310 may form an integral part of objects 160 and 190 respectively, or could be mounted to the surfaces 150 and 180 of objects 160 and 190 by other means.

One benefit of coupling top springs 60 via holders 170 is that the holders may help to stabilize each spring and limit deflection and sideway motion of the spring during vibrations and/or shocks. In this regard, a depth of each spring holder may be adjusted based on a given application and/or anticipated level of vibrational/shock disturbance.

It should be noted that while top springs 60 and bottom springs 30 do not need to be attached to adjacent surfaces 180 and 150 respectively, to provide isolation they do need to remain within spring cups 300 and 310. It is understood therefore, that spring cups 300 and 310 must be of sufficient depth to ensure that displacement in the ±z direction due to shock or vibration does not result in springs 30 or 60 falling out of their respective spring cups. Furthermore it is understood that the spring cups 300 and 310 can not be too deep to ensure that they do not contact spring holder cups 130 and 170 respectively during operation. Furthermore as described below with respect to shock stop 50 the depths of spring cups 300 and 310 must be sized according to the maximum expected displacement to avoid the springs from coming loose during a large displacement.

Indeed, when device 10 is oriented as shown in FIG. 4, the forcing frequency (vibration input) is in the +z and −z axis. Top springs 60 are advantageously mounted such that they do not ever contact object 190 or surface 180 while still remaining within spring cups 310. In fact, it has been shown that if the top springs are allowed to contact surface 180, the forcing frequency increases in amplitude greatly. However, when the forcing frequency is not directly in the +z and −z axis, then the top springs 60 act to supply isolation functionality along with the bottom springs 30. This lateral loading of the isolator results in a completely different spring rate required to effectively isolate whatever device is mounted to mounting structure 20 since the springs are not in a compression state but rather bending. Isolator 10 allows upper and lower springs 60 and 30 to bend or buckle, providing the equivalent spring force to springs in compression. It should be apparent to one skilled in the art, that the bending and compression factors must be accounted for and considered simultaneously so as not to have a spring failure due to excessive bending stress in the spring wire.

Further, top springs 60 may further limit displacement of object 120 and prevent object 120 from contacting other objects, such as adjacent object 190, in the presence of external vibrations and/or shocks. The combination of top springs 60 and bottom springs 30 effectively minimize displacement of the object 120 in both vertical, horizontal, and lateral directions when subjected to vibration and/or shock inputs along all six axes (i.e., ±x-axis, ±y-axis, and ±z-axis). Also, the combination of top springs 60 and bottom springs 30 may counteract any oscillations that could potentially develop in either the bottom or top springs.

When in use, isolating device 10 may be mounted in a variety of configurations and orientations. Accordingly, the isolators must account for mounting the end device in any orientation, including upside down. As will be recognized, to achieve a desired amount of isolation, various spring parameters of top springs 60 and bottom springs 30 may be calculated/selected accordingly. In particular, parameters, such as a spring stiffness (or spring rate), spring diameter, wire diameter, wire material, wire end conditions and spring-free length, etc., may be computed and/or adjusted accordingly to meet specific isolation design criteria and also to maximize spring life for various load conditions, anticipated vibration/shock conditions, etc. Those skilled in the art will appreciate that various available spring simulation/calculation tools could be used for this purpose.

In a normal operation, the combination of top springs 60 and bottom springs 30 may be sufficient to isolate object 120 from a variety of vibrations of different frequencies and/or shocks transmitted from external source(s). However, the present invention recognizes that in some situations, object 120 could be subjected to external shock signals of sufficiently high amplitude/magnitude that may not be effectively reduced by bottom springs 30 an/or top springs 60, and in effect, could be almost entirely or partially coupled to object 120.

Figure 7:
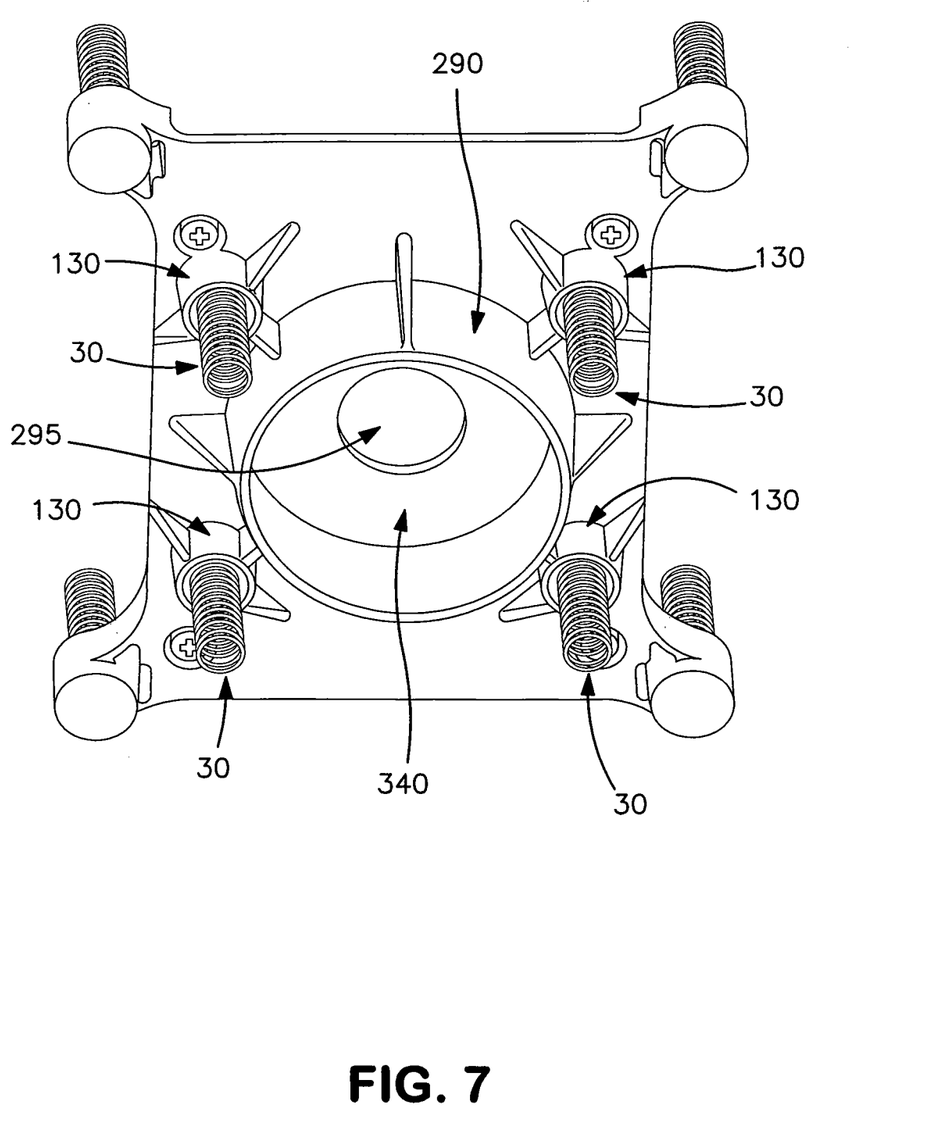
FIG. 7. is a perspective view of the bottom of the vibration isolation device in accordance with an embodiment of the present invention.

As noted above, vibration isolating device 10 works in conjunction with shock stop 50 and shock cup 290. Shock stop 50 may be mounted to surface 150 of object 160 and extends perpendicularly upwards from surface 150 into shock cup 290 without contacting the sides of shock cup 290 or surface 340 of mounting plate 20. In one embodiment, shock cup 290 is an integral part of mounting base 20 although it could be a separate component attached to mounting base 20 by one of several known means such as welding or screwing. Shock cup 290 extends in the −z-direction from surface 340 as indicated in FIG. 7 and is formed from protruding wall 291 shown in FIG. 5. Shock cup 290 should be sufficiently large enough and deep enough to accommodate shock stop 50 without allowing it to contact the inner walls or surface 340. Shock stop 50 may be coupled to any surface isolated from and opposite to a side on which object 120 is mounted. Shock stop 50 is preferably disk-shaped although other geometries, such as rectangular or oval may be used without impacting the effective ability of shock stop 50 to dampen shock or vibration. It should be further understood, however, that the geometry of shock stop 50 impacts the geometry of shock cup 290 and protruding wall 291 and care should be taken to ensure that the chosen geometries do not interfere with the isolation performance of device 10.

Shock stop 50 is positioned adjacent to a central area of object 120 (or mounting structure 20). In one embodiment, shock stop 50 is a disk having a surface area of at least 20% of a surface area of object 120. The area of the shock stop is not a primary consideration, however, it does play a role and is a factor in the design but it can vary greatly based on the material used for the shock stop and with the amount of displacement that is allowable in the final mounting area of the full isolation system. Center-mounted shock stop 50 may essentially operate as a damping element to absorb, or dissipate, mechanical (kinetic) energy generated by shock excitation. The width and thickness or area size of the shock stop 50 varies depending on the material chosen and with the amount of displacement that is allowable in the final mounting area of the full isolation system.

In a normal operation, shock stop 50 will be coupled to surface 150 which is not in contact with isolator 10 or mounting structure 20. Shock stop 50 extends into shock cup 290, but does not contact surface 340 of mounting plate 20 or protruding wall 291 until acted on by an external vibration or shock that exceeds a given level, such as a particular signal amplitude or magnitude (e.g., at a particular vibration frequency) or an amount of force (e.g., a acceleration-based g-force (e.g., a ng/Hz input or $ng^2$/Hz random inputs).

By way of example, referring back to FIG. 4, mounting structure 20 holding object 120 could sit above adjacent object 160. Shock stop 50 is connected to surface 150 of object 160 and does not contact mounting structure 20 or surface 340 under normal operating conditions. If a shock pulse 200 of sufficiently high amplitude is applied to mounting structure 20 in the −z axis, bottom springs 30 will be compressed excessively, and the mounting structure could be displaced from its normal position in the −z direction.

In the absence of shock stop 50, mounting structure 20 could contact with adjacent object 160, potentially resulting in damage to both objects 160 and 120. With shock stop 50 in place, however, mechanical energy caused by shock pulse 200 can be absorbed and dissipated by shock stop 50. Thus, shock stop 50 essentially acts as a "buffer" between object 120 (or mounting structure 20 holding object 120) and adjacent object 160 when the shock exceeds a given level in the −z direction, such as the level that cannot be effectively reduced by the springs.

FIG. 7 shows a perspective view of the bottom of an embodiment of isolator 10 with shock stop 50 omitted. The underside of surface 20 in this embodiment details integral spring cups 130, shock cup 290, opening 295 and surface 340 built into a single structure, while such integrated components may simplify assembly, it is to be understood, that isolator 10 can be comprised of component parts held together by any known means, such as welding, bolting, screwing, etc.

Figure 5:
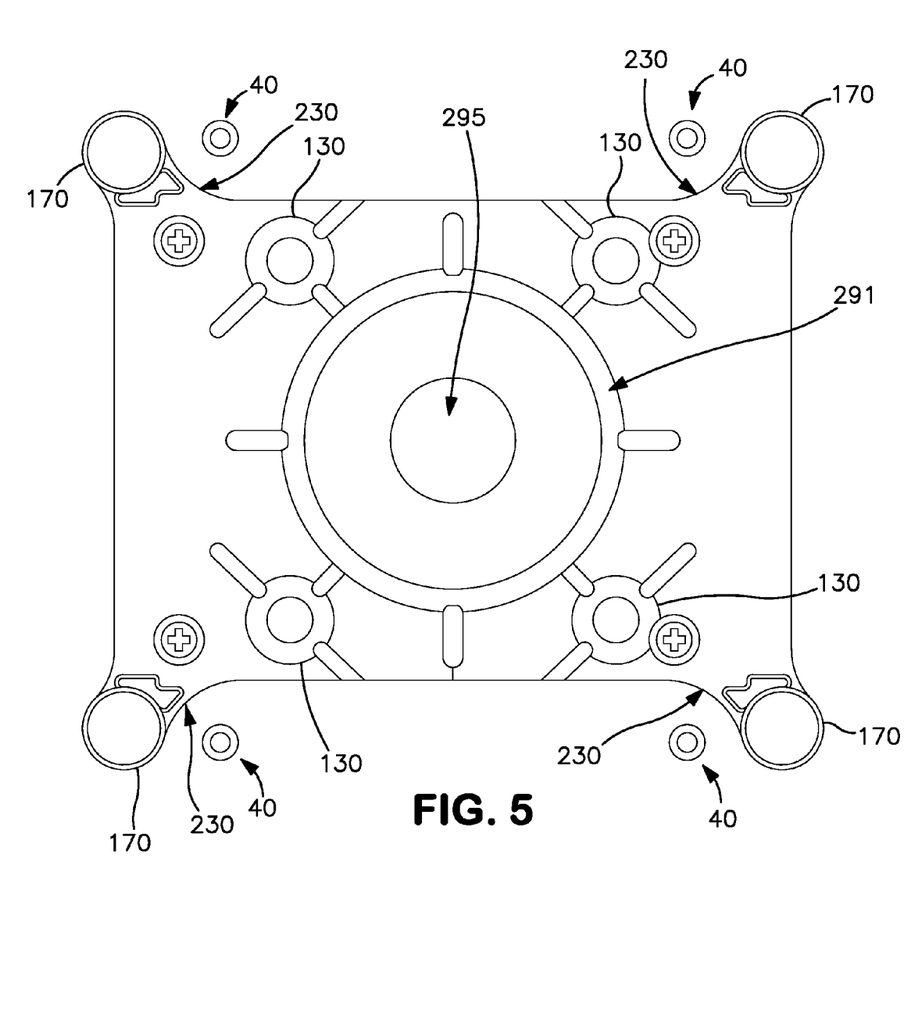
FIG. 5 is a bottom view of the vibration isolation device in accordance with an embodiment of the present invention.

As shown in FIGS. 5 and 7, mounting structure 20 may include an opening 295 in base structure 20. Opening 295 may act to allow any heat generated by device 120 to dissipate. Mounting structure 20 also contains a protruding wall 291. Protruding wall 291, as shown in FIG. 5, acts as the surrounding walls of shock cup 290. Shock stop 50 is sized so as to not contact the inner walls of shock cup 290 or the surface 340 of mounting plate 20 in a normal state. It will be understood therefore, that the spacing between the walls of shock cup 290 and shock stop 50 serve as what is referred to as "sway space". The sway space allows isolator 10 to move freely so it can effectively isolate vibration. As will be appreciated by those skilled in the art, that as soon as any contact is made between isolator 10 and shock stop 50, vibration isolation ceases to function correctly. Thus, the sway space is application specific to a large extent and can be tuned together with the rest of the system to come up with a desirable or allowable tolerances. The geometry of the shock stop is such that the sway space surrounding shock stop 50 and the distance between the top surface of shock stop 50 and surface 340 of mounting plate 20 are the same. Accordingly, the sway space distance in any combination of axis displacement due to shock is equal.

It should be understood therefore that the total potential displacement in the −z direction includes the space between the upper surface of shock block 50 (the "sway space") and surface 340 plus any compression of shock block 50 that may occur. This total potential displacement impacts the design depths of spring cups 310. As will be understood by those skilled in the art, the depth of spring cup 310 must be greater then the total possible displacement in the −z direction to ensure that upper springs 60 do not dislocate from within spring cups 310 during displacement in the −z direction. Similarly, it will be further appreciated by those skilled in the art, that shock stop 50 can dampen and isolate shock in five of the six axes, it does not however, function to isolate shocks to isolator 10 in the +z direction as shown in FIG. 4. An additional stop 330 may be placed above object 120 on the surface 180 the same distance away from the device to be isolated as the distance between surface 340 and the top surface of item 50, thereby allowing for shock dampening equally in all six directions. Total possible displacement in the +z direction therefore is the distance between the bottom surface of stop 330 and the top of object 120 plus any compression of stop 330. This distance, likewise impacts the design depth of spring cups 300. Spring cups 300 must be deeper then the potential total displacement in the +z direction to ensure that springs 30 do not come loose during a maximum displacement in the +z direction. These distance, like the size of stop block 50 and shock cup 290, are adjustable per application of the isolator.

In an embodiment, shock stop 50 includes material(s) with sufficiently high shock-absorbing properties. Examples of suitable shock-absorbing materials include, for example, materials having a Shore A or Shore D rating in the range of 0-70 Durometer. Suitable materials could be silicone, urethane, cellular gel, cellular foam, rubber, or any combinations thereof or any other suitable material with similar shock ratings.

In addition to stop shock 50, vibration isolating device 10 will preferably comprise additional displacement-limiting features to limit displacement of object 120 in the presence of severe vibrations and/or shocks from external source(s). In particular, in an embodiment, vibration isolating device 10 comprises stop pins 40 that are separate from mounting structure 20 and arranged externally to the mounting structure 20.

As shown in FIGS. 3 and 4, for example, stop pins 40 are arranged externally to mounting structure 20, such as around the perimeter of the mounting structure. As shown in FIG. 4, each stop pin 40 may be adjacent to one respective top spring 60, and may include one or more elongated members 210 and a stop portion 220. Stop pins 40 are preferably directed substantially perpendicular to object 120 or base 90 of the mounting structure 20. Further, one end, such as end 240, of each of the stop pins may be held or attached in a place via any suitable means. The stop pins 40 may be press fit pins that are pressed into the housing (not shown) directly or screwed into the housing in which the isolator is installed. This is another variable based on the overall design as no two applications will have the same critical stop areas or available space for the stop pins 40 to be placed.

In a normal operation, mounting structure 20 holding object 120 will preferably not contact any of stop pins 40 until the vibration or shock exceeds a given level, such as a particular signal amplitude or magnitude (e.g., at a particular vibration frequency) or an amount of force (e.g., an acceleration-based g-force (e.g., a ng/Hz input or ng$^2$/Hz random inputs)).

Note that the given level at which stop pins 40 operate to limit a displacement of object 120 could be the same or different from a level at which shock stop 50 operates to limit the displacement of the object 120. Preferably, the sway space associated with shock stop 50 and shock cup 290 is less then the displacement limits imposed by stop pins 40.

As shown in FIG. 4, each stop portion 220 could have a cylindrical shape although other shapes such as hexagonal or other geometries could be used. This feature helps to minimize contact surface area when mounting structure 20 holding object 120 comes in contact with any of stop pins 40. Additionally, as noted above, each stop pin 40 may be adjacent to one respective top spring 60, or its corresponding spring holder 170. In this regard, as shown in FIGS. 3 and 5, spring holders 170 or mounting structure 20 may have curved portions 230.

One advantage of this feature is that when a contact occurs, the stop pin 40 may not only limit any further movement of object 120, but may also allow mounting structure 20 to "slide" against the stop pin, preventing potentially undesirable jerks. Further, each stop portion 220 may comprise a shock-absorbing material such that the stop portion 220 may operate as a damping element to absorb, or dissipate, mechanical energy generated due to vibration or shock excitation when the contact occurs.

In this regard, each stop portion 220 will preferably include material(s) with sufficiently high shock-absorbing absorbing properties. Examples of suitable shock-absorbing materials include, for example, materials having a Shore A or Shore D rating in the range of 0-70 Durometer. Suitable materials could be silicone, urethane, cellular gel, cellular foam, rubber, or any combinations thereof or other materials with similar shock-absorbing properties.

In addition, the curved features of each of spring holders 170 may assist stop pins 40 in limiting a displacement of object 120, such as along different axes of travel.

Figure 6:
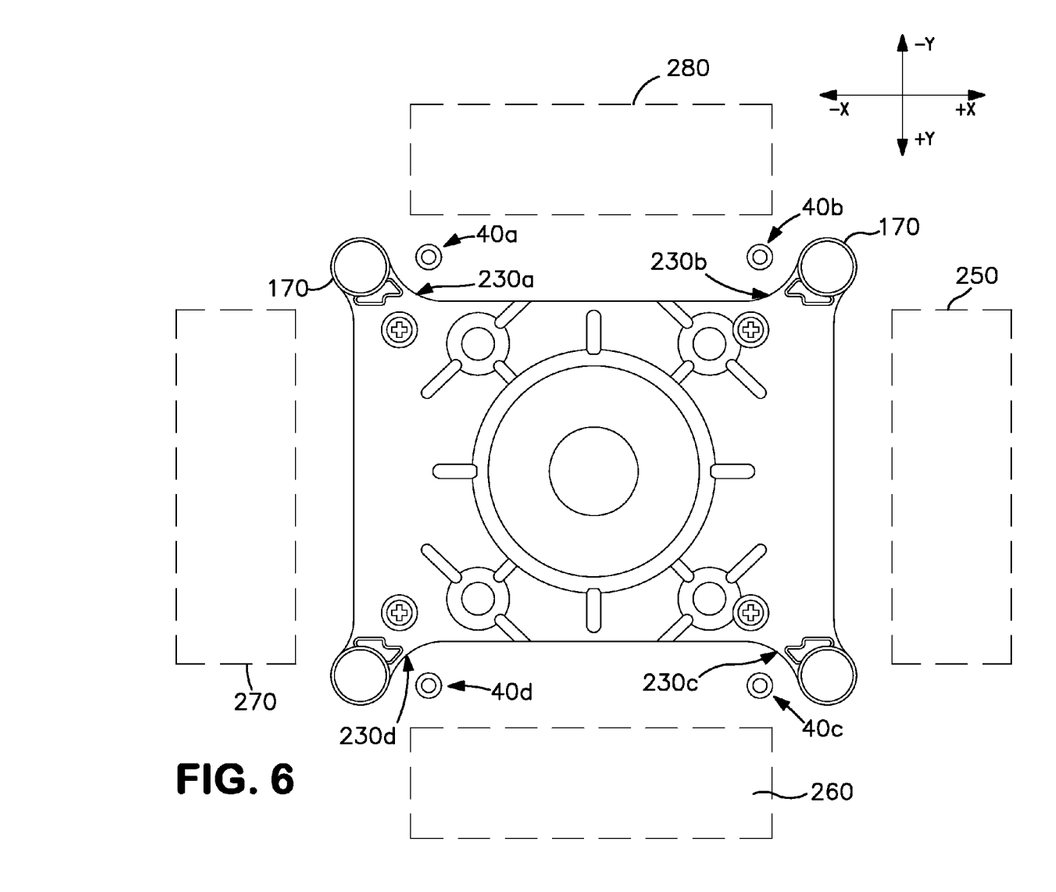
FIG. 6 is a bottom view of an embodiment of the vibration isolation device in proximity to adjacent objects.

By way of example, referring to FIG. 6, during vibration or a shock pulse of sufficiently high amplitude, stop pins 40*a* and 40*b* together with curve portions 230*a* and 230*b* could limit displacement of object 120 along −y axis to prevent contact with an adjacent object 280. Stop pins 40*b* and 40*c* together with curve portions 230*b* and 230*c* could limit displacement of object 120 along −x-axis to prevent contact with an adjacent object 270. Then, stop pins 40*c* and 40*d* together with curve portions 230*c* and 230*d* could limit displacement of object 120 along +y axis to prevent contact with an adjacent object 260. Similarly, stop pins 40*d* and 40*a* together with curved portions 230*d* and 230*a* could limit displacement of object 120 along +x-axis to prevent contact with an adjacent object 250. (Note that the above example is provided for illustration purposes only, and particular axis of orientation, directions of travel, etc. are only illustrative).

In effect, each curved portion 230 and adjacent stop pin 40 could operate to limit displacement of object 120 for two axes of travel. Further, in general, stop pins 40 could essentially act as a "buffer" between object 120 (or mounting structure 20 holding object 120) and any adjacent object(s) when vibration and/or shock exceeds a given level, such as the level that cannot be effectively reduced by the springs. Note that spring holders 170 could be sized/shaped and spaced accordingly for a given application and/or anticipated magnitude of vibrational/shock disturbance. Similarly, stop pins 40, which are independent from mounting structure 20, could be arbitrarily sized (e.g. by selecting a given size of cylindrical stop portion 220) and spaced around the mounting structure as well, such as based on a given application and/or anticipated magnitude of vibrational/shock disturbance. Further, in other embodiments, stop pins 40 could be shaped/structured in different ways from those described above.

The amount of force required for the isolator to contact the shock stop and/or the over stop pins is specific to each application of the isolator system as the mass of the system varies. In one example, the disclosed system was able to protect against both a 30G 18 ms and a 50G 11 ms shock pulse input.

While various embodiments have been described above, it should be understood that they have been presented by way of example only, and not of limitation. Likewise, the various diagrams may depict an example architectural or other configurations and is intended to aid in understanding the features and functionality that can be included. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present inventions.

Although, described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments, whether or not such embodiments are described and whether or not such features are presented as being a part of a described embodiment. Thus the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

As will become apparent to one of ordinary skill in the art after reading this document, the illustrated embodiments and their various alternatives can be implemented without confinement to the illustrated examples. For example, the diagrams and their accompanying descriptions should not be construed as mandating a particular architecture, geometry or configuration.

What is claimed is:

1. A vibration isolating device for isolating an object from at least one of vibration and shock from an external source, comprising:
   a mounting structure having an area for mounting the object thereon;
   a plurality of first springs coupled to the mounting structure and operative to minimize coupling of the at least one vibration and shock to the object;
   a shock stop comprising a first shock-absorbing material in proximity to a side of the mounting structure opposite to the object and operative to limit a first displacement of the object when the at least one vibration and shock exceeds a first given level;
   a shock cup attached to the mounting structure, wherein the shock stop extends into the shock cup such that a sway space is established between walls of the shock cup and surfaces of the shock stop; and
   a plurality of stop pins separate from the mounting structure and arranged externally about the mounting structure, the plurality of stop pins operative to limit a second displacement of the object when the at least one vibration and shock exceeds a second given level, wherein each of the stop pins includes a second shock-absorbing material.

2. The device of claim 1, further comprising a plurality of second springs operative to further minimize coupling of the at least one vibration and shock to the object.

3. The device of claim 2, wherein the mounting structure has a top portion and a bottom portion, and wherein the first springs are coupled to the bottom portion, and the second springs are coupled to the top portion.

4. The device of claim 2, wherein each of the first springs and each of the second springs includes a helical compression spring.

5. The device of claim 1, wherein each of the first springs has one end that abuts or is attached to a surface of an adjacent object.

6. The device of claim 2, wherein each of the second springs has one end that abuts or is attached to a surface of an adjacent object.

7. The device of claim 1, wherein each of the first springs has one end that is housed in a mounting device that is attached to a surface of an adjacent object.

8. The device of claim 2, wherein each of the second springs has one end that is housed in a mounting device that is attached to a surface of an adjacent object.

9. The device of claim 2, wherein each of the first and second springs is substantially perpendicular to the area of the mounting structure on which the objected is mounted.

10. The device of claim 1, wherein each of the first springs is coupled to the mounting structure via a spring holder, and wherein the spring holder is a part separate from the mounting structure or an integral part of the mounting structure.

11. The device of claim 2, wherein each of the second springs is coupled to the mounting structure via a spring holder, and wherein the spring holder is a part separate from the mounting structure or an integral part of the mounting structure.

12. The device of claim 2, wherein the mounting structure is rectangular and the second springs are disposed around the mounting structure at four corners.

13. The device of claim 2, wherein the plurality of first springs is four first springs, and wherein the plurality of second springs is four second springs.

14. The device of claim 1, wherein the shock stop is operative to limit the first displacement of the object when the at least one vibration and shock exceeds the second given level that is same or different from the first level.

15. The device of claim 1, wherein the first shock absorbing material has a Shore A or Shore D rating of 0-70 Durometer.

16. The device of claim 1, wherein the first shock absorbing material is selected from the group consisting of silicone, urethane, cellular gel, cellular foam, rubber, and combinations thereof.

17. The device of claim 14, wherein the shock stop is connected to an adjacent object and does not come into contact with the mounting structure until the at least one vibration and shock exceeds the second given level.

18. The device of claim 1, wherein the second given level is greater than the first given level.

19. The device of claim 1, wherein the second shock absorbing material has a Shore A or Shore D rating of 0-70 Durometer.

20. The device of claim 1, wherein the second shock absorbing material is selected from the group consisting of silicone, urethane, cellular gel, cellular foam, rubber, and combinations thereof.

21. The device of claim 1, wherein the plurality of stop pins is four stop pins.

22. A vibration isolating device for isolating an object from at least one of vibration and shock from an external source, comprising:
   a mounting structure having an area for mounting the object thereon;
   a plurality of first springs coupled to the mounting structure and operative to minimize coupling of the at least one vibration and shock to the object;
   a shock stop comprising a first shock-absorbing material in proximity to a side of the mounting structure opposite to the object and operative to limit a first displacement of the object when the at least one vibration and shock exceeds a first given level;
   a shock cup attached to the mounting structure, wherein the shock stop extends into the shock cup such that a sway space is established between walls of the shock cup and surfaces of the shock stop;
   a plurality of stop pins separate from the mounting structure and arranged externally about the mounting structure, the plurality of stop pins operative to limit a second displacement of the object when the at least one vibration and shock exceeds a second given level; and
   a plurality of second springs operative to further minimize coupling of the at least one vibration and shock to the object, wherein each stop pin is adjacent to the respective one of the plurality of second springs.

23. A vibration isolating device for isolating an object from at least one of vibration and shock from an external source, comprising:
   a mounting structure having an area for mounting the object thereon;
   a plurality of first springs coupled to the mounting structure and operative to minimize coupling of the at least one vibration and shock to the object;
   a shock stop comprising a first shock-absorbing material in proximity to a side of the mounting structure opposite to the object and operative to limit a first displacement of the object when the at least one vibration and shock exceeds a first given level;

a shock cup attached to the mounting structure, wherein the shock stop extends into the shock cup such that a sway space is established between walls of the shock cup and surfaces of the shock stop;

a plurality of stop pins separate from the mounting structure and arranged externally about the mounting structure, the plurality of stop pins operative to limit a second displacement of the object when the at least one vibration and shock exceeds a second given level; and wherein each of the first springs is coupled to the mounting structure via a spring holder, wherein the spring holder is a part separate from the mounting structure or an integral part of the mounting structure, and wherein each spring holder has a curved portion, and wherein each stop pin is adjacent to a curved portion of a respective spring holder.

24. The device of claim 23, wherein each of the plurality of stop pins in combination with the respective curved portion limits the second displacement of the object along two axes of motion.

25. A vibration isolating device for isolating an object from at least one of vibration and shock from an external source, comprising:

a mounting structure having an area for mounting the object thereon;

a plurality of first springs coupled to the mounting structure and operative to minimize coupling of the at least one vibration and shock to the object;

a shock stop comprising a first shock-absorbing material in proximity to a side of the mounting structure opposite to the object and operative to limit a first displacement of the object when the at least one vibration and shock exceeds a first given level;

a shock cup attached to the mounting structure, wherein the shock stop extends into the shock cup such that a sway space is established between walls of the shock cup and surfaces of the shock stop;

a plurality of stop pins separate from the mounting structure and arranged externally about the mounting structure, the plurality of stop pins operative to limit a second displacement of the object when the at least one vibration and shock exceeds a second given level; and wherein the mounting structure has a plurality of curved portions, and wherein each stop pin is adjacent to a respective one of the plurality of curved portions.

26. The device of claim 25, wherein each of the plurality of stop pins in combination with the respective curved portion limits the second displacement of the object along two axes of travel.

* * * * *